US011885155B2

(12) United States Patent
Grant et al.

(10) Patent No.: US 11,885,155 B2
(45) Date of Patent: Jan. 30, 2024

(54) CABINET LOCK FOR USE WITH PROGRAMMABLE ELECTRONIC KEY

(71) Applicant: InVue Security Products Inc., Charlotte, NC (US)

(72) Inventors: Jeffrey A Grant, Charlotte, NC (US); David N. Berglund, Indian Trail, NC (US); Hrishikesh P. Gogate, Charlotte, NC (US); Justin A. Richardson, Waxhaw, NC (US); William W. Warren, Fort Mill, SC (US); Andrew W. Moock, Brecksville, OH (US)

(73) Assignee: InVue Security Products, Inc., Charlotte, NC (US)

( * ) Notice: Subject to any disclaimer, the term of this patent is extended or adjusted under 35 U.S.C. 154(b) by 0 days.

(21) Appl. No.: 17/101,684

(22) Filed: Nov. 23, 2020

(65) Prior Publication Data

US 2021/0071443 A1 Mar. 11, 2021

Related U.S. Application Data

(63) Continuation of application No. 15/600,090, filed on May 19, 2017, now abandoned, which is a
(Continued)

(51) Int. Cl.
*E05B 47/02* (2006.01)
*G07C 9/00* (2020.01)
(Continued)

(52) U.S. Cl.
CPC .............. *E05B 47/02* (2013.01); *E05B 17/10* (2013.01); *E05B 41/00* (2013.01); *E05B 47/026* (2013.01);
(Continued)

(58) Field of Classification Search
None
See application file for complete search history.

(56) References Cited

U.S. PATENT DOCUMENTS 2,172,208 A * 9/1939 Kurtzon .............. E05B 65/0894 70/14
2,716,881 A 9/1955 Terrill
(Continued)

FOREIGN PATENT DOCUMENTS

WO 92-07156 A1 4/1992
WO 2002-042584 A1 5/2002
(Continued)

OTHER PUBLICATIONS

International Search Report and Written Opinion from corresponding International Patent Application No. PCT/US2012/057784; 9 pages; dated Dec. 28, 2012.
(Continued)

*Primary Examiner* — Curtis J King
(74) *Attorney, Agent, or Firm* — InVue Security Products Inc.

(57) ABSTRACT

A cabinet lock for protecting merchandise within a merchandise display cabinet having an inner door and an outer door. The cabinet lock includes a strike plate affixed to the inner door and a lock housing affixed to the outer door such that the cabinet is in a locked configuration that prevents access to the merchandise when the lock housing is operably engaged to the strike plate. A programmable electronic key communicates a security code with the cabinet lock and transfers electrical power to the cabinet lock to operate a lock mechanism between the locked configuration and an unlocked configuration. An indicator is provided for indicating whether the cabinet lock is in the locked configuration or the unlocked configuration. The indicator includes a first
(Continued)

segment and a second segment that can be energized to visually indicate the status of the cabinet lock.

27 Claims, 6 Drawing Sheets

Related U.S. Application Data continuation of application No. 14/476,871, filed on Sep. 4, 2014, now abandoned, which is a continuation of application No. 13/629,812, filed on Sep. 28, 2012, now Pat. No. 8,860,574.

(60) Provisional application No. 61/625,054, filed on Apr. 16, 2012, provisional application No. 61/540,577, filed on Sep. 29, 2011.

(51) Int. Cl.
*E05B 65/08* (2006.01)
*E05B 17/10* (2006.01)
*E05B 63/18* (2006.01)
*E05B 41/00* (2006.01)

(52) U.S. Cl.
CPC ........ *E05B 63/185* (2013.01); *E05B 65/0864* (2013.01); *G07C 9/00896* (2013.01); *G07C 2009/0092* (2013.01); *G07C 2009/00634* (2013.01); *Y10T 70/20* (2015.04); *Y10T 70/40* (2015.04); *Y10T 70/50* (2015.04); *Y10T 70/5004* (2015.04); *Y10T 70/5093* (2015.04); *Y10T 70/5097* (2015.04); *Y10T 70/5173* (2015.04); *Y10T 70/5867* (2015.04); *Y10T 70/7113* (2015.04); *Y10T 70/7921* (2015.04)

(56) References Cited

U.S. PATENT DOCUMENTS 2,878,663 A * 3/1959 Smith ................. E05B 65/0894 70/14
3,014,747 A 12/1961 Nichols
3,761,892 A * 9/1973 Bosnyak ............ G07C 9/00182 235/382
3,807,627 A * 4/1974 Nitschneider ............. G07F 9/06 232/15
3,922,895 A * 12/1975 Greenebaum ........... E05B 11/02 70/100
3,931,723 A * 1/1976 Kurtz .................. E05B 65/0864 70/14
3,956,911 A * 5/1976 Corboud ............. E05B 65/0864 70/100
4,031,434 A 6/1977 Perron et al.
4,078,835 A 3/1978 Spencer
4,080,811 A 3/1978 Neilsen, Jr.
4,141,610 A * 2/1979 Ando ...................... A47F 3/002 292/144
4,172,254 A * 10/1979 Vermillion ............. G08B 13/08 200/61.67
4,207,555 A * 6/1980 Trombly ............ G07C 9/00182 235/382.5
4,234,909 A * 11/1980 Cotroneo ................ E05B 17/10 362/100
4,250,533 A * 2/1981 Nelson ............... G07C 9/00309 340/5.25
4,254,868 A * 3/1981 Humble .............. E05B 73/0017 206/1.5
4,260,063 A * 4/1981 Bennett ................. E05B 69/006 211/4
4,267,962 A * 5/1981 Domkowski ............. G07F 9/06 232/15
4,286,305 A 8/1981 Pilat et al.
4,356,580 A * 11/1982 Kurtz .................. E05B 65/0894 70/14
4,621,589 A * 11/1986 Thinnes ............... A01K 27/004 119/770
4,673,915 A * 6/1987 Cobb ....................... G08B 5/36 340/330
4,819,463 A * 4/1989 Jacobs .................... E05B 67/36 70/14
4,829,296 A * 5/1989 Clark ................. G07C 9/00309 232/7
4,843,373 A * 6/1989 Trickle ................ B65G 69/003 340/540
4,852,303 A * 8/1989 Rolek ..................... A47F 3/043 49/504
4,885,920 A * 12/1989 Larson .................. E05B 67/006 70/49
4,891,636 A * 1/1990 Rieker ..................... G07C 9/20 340/5.65
4,909,053 A * 3/1990 Zipf, III .............. E05B 47/0623 292/144
4,937,437 A * 6/1990 Ferguson ........... G07C 9/00182 235/382
4,941,289 A * 7/1990 Rolek ................... F25D 23/082 49/504
4,949,901 A * 8/1990 Harris .................. G07D 11/125 232/15
4,990,906 A * 2/1991 Kell ........................ B60R 25/04 340/5.23
5,010,331 A * 4/1991 Dias ........................ G04F 1/005 340/5.28
5,046,084 A * 9/1991 Barrett ............... G07C 9/00817 340/5.33
5,103,085 A * 4/1992 Zimmerman ........... G01S 17/06 250/214 B
5,111,007 A * 5/1992 Miller ..................... E05B 17/10 116/286
5,117,097 A 5/1992 Kimura et al.
5,140,317 A 8/1992 Hyatt, Jr. et al.
5,179,325 A * 1/1993 Aragon, Jr. ............. E05B 17/10 315/129
5,275,027 A * 1/1994 Eklof .................... A47F 5/0861 211/4
5,280,518 A * 1/1994 Danler ............... G07C 9/00309 379/102.06
5,287,653 A * 2/1994 Young ................. E05D 15/1065 312/295
5,288,981 A * 2/1994 Davis ............... G06K 19/06187 235/449
5,351,042 A * 9/1994 Aston ................... E05B 47/063 340/5.61
5,375,708 A * 12/1994 Wittman ............. E05B 73/0023 206/315.1
5,392,025 A * 2/1995 Figh ....................... G08B 13/14 340/5.3
5,416,471 A * 5/1995 Treharne ............. B60R 25/2009 340/426.28
5,437,174 A * 8/1995 Aydin ................. E05B 47/0012 70/150
5,477,213 A * 12/1995 Atarashi ............ G07C 9/00817 235/382.5
5,479,799 A * 1/1996 Kilman ................. F16B 41/005 411/402
5,508,694 A * 4/1996 Treharne ............. B60R 25/2009 340/426.28
5,552,776 A * 9/1996 Wade ...................... G06F 21/31 340/5.22
5,574,429 A * 11/1996 Streeter .............. G08B 13/1436 340/529
5,605,066 A * 2/1997 Hurskainen ........ G07C 9/00182 70/277
5,608,605 A * 3/1997 Siow ................... E05B 73/0005 361/679.43
5,634,710 A * 6/1997 Di Russo ................ E05B 17/10 362/100
5,659,471 A * 8/1997 Parmee ................... B60R 25/06 307/10.2

(56) References Cited

U.S. PATENT DOCUMENTS

| | | | | |
|---|---|---|---|---|
| 5,689,978 | A * | 11/1997 | Eklof | A47F 5/0861 211/4 |
| 5,690,402 | A * | 11/1997 | Koppe | A47F 3/004 312/114 |
| 5,701,828 | A * | 12/1997 | Benore | G07C 9/00912 109/56 |
| 5,709,114 | A * | 1/1998 | Dawson | G07C 9/00912 70/284 |
| 5,712,626 | A * | 1/1998 | Andreou | G07C 9/00817 340/5.67 |
| 5,722,266 | A * | 3/1998 | Yeager | A45C 13/20 24/18 |
| 5,729,057 | A * | 3/1998 | Frenzel | B60Q 1/323 180/287 |
| 5,745,044 | A | 4/1998 | Hyatt, Jr. et al. | |
| 5,758,522 | A * | 6/1998 | York | E05B 47/0688 70/63 |
| 5,765,801 | A * | 6/1998 | Geiselman | A47F 5/0861 248/552 |
| 5,774,058 | A * | 6/1998 | Henry | G07C 9/00912 340/5.5 |
| 5,774,059 | A * | 6/1998 | Henry | E05B 43/005 235/380 |
| 5,774,066 | A * | 6/1998 | Pellaton | E05B 43/005 340/12.23 |
| 5,794,464 | A * | 8/1998 | Yeager | A45C 13/20 24/18 |
| 5,797,487 | A * | 8/1998 | Young | G11B 33/0405 206/307 |
| 5,848,541 | A | 12/1998 | Glick et al. | |
| 5,856,782 | A | 1/1999 | Sasagawa et al. | |
| 5,873,276 | A * | 2/1999 | Dawson | G07C 9/00912 70/284 |
| 5,905,446 | A * | 5/1999 | Benore | G07C 9/27 340/5.7 |
| 5,909,932 | A * | 6/1999 | Shih | A47F 3/10 312/135 |
| 5,933,086 | A * | 8/1999 | Tischendorf | G07C 9/00857 340/5.22 |
| 5,942,978 | A * | 8/1999 | Shafer | G08B 13/246 340/572.9 |
| 5,986,563 | A * | 11/1999 | Shapiro | G07C 9/00706 235/382 |
| 6,005,487 | A | 12/1999 | Hyatt, Jr. et al. | |
| RE36,505 | E * | 1/2000 | Treharne | B60R 25/2009 340/426.28 |
| 6,056,376 | A * | 5/2000 | Yenglin | E05D 15/58 312/138.1 |
| 6,102,553 | A * | 8/2000 | Ting | G02B 27/20 353/101 |
| 6,107,934 | A * | 8/2000 | Andreou | E05B 47/068 340/5.71 |
| 6,131,808 | A * | 10/2000 | Pires | G06K 17/00 235/375 |
| 6,164,098 | A * | 12/2000 | Hommes | E05B 63/0052 292/1 |
| 6,297,725 | B1 * | 10/2001 | Tischendorf | G07C 9/00857 340/5.64 |
| 6,331,812 | B1 * | 12/2001 | Dawalibi | G07C 9/00857 340/5.2 |
| 6,384,711 | B1 | 5/2002 | Cregger et al. | |
| 6,412,207 | B1 * | 7/2002 | Crye | F41A 17/02 42/70.01 |
| 6,496,101 | B1 * | 12/2002 | Stillwagon | E05B 5/003 340/5.61 |
| 6,525,644 | B1 | 2/2003 | Stillwagon | |
| 6,577,234 | B1 * | 6/2003 | Dohrmann | G08B 13/00 340/540 |
| 6,604,394 | B2 * | 8/2003 | Davis | E05B 17/2092 70/278.3 |
| 6,658,905 | B1 | 12/2003 | Hsieh | |
| 6,718,806 | B2 | 4/2004 | Davis | |
| 6,755,450 | B1 * | 6/2004 | Chen | E05C 19/182 292/289 |
| 6,778,067 | B2 * | 8/2004 | Kakuta | G07C 9/00182 340/10.34 |
| 6,833,357 | B2 | 12/2004 | Cines | |
| 6,879,242 | B1 * | 4/2005 | Alon | E05B 49/006 340/5.2 |
| 6,882,282 | B1 * | 4/2005 | Lie-Nielsen | G07C 9/38 340/686.1 |
| 6,895,792 | B2 * | 5/2005 | Davis | E05B 17/2092 70/278.3 |
| 6,960,991 | B2 | 11/2005 | Orcifalvi et al. | |
| 7,007,985 | B2 * | 3/2006 | Alexander | E05B 59/00 292/163 |
| 7,212,099 | B2 | 5/2007 | Zhai | |
| 7,392,673 | B2 * | 7/2008 | Fawcett | A47F 5/0861 211/7 |
| 7,712,342 | B2 * | 5/2010 | Loughlin | E05B 37/10 70/366 |
| 7,737,843 | B2 * | 6/2010 | Belden, Jr. | G08B 13/2434 340/568.2 |
| 7,737,844 | B2 * | 6/2010 | Scott | G08B 13/2411 340/568.2 |
| 7,737,845 | B2 * | 6/2010 | Fawcett | G07C 9/00309 340/568.2 |
| 7,737,846 | B2 | 6/2010 | Belden, Jr. et al. | |
| 7,791,458 | B2 * | 9/2010 | Shimaoka | B60Q 1/085 340/435 |
| 8,347,674 | B2 * | 1/2013 | Trempala | G07C 9/00182 70/283.1 |
| 8,860,574 | B2 | 10/2014 | Grant et al. | |
| 9,536,359 | B1 * | 1/2017 | Gokcebay | E05B 47/06 |
| 2001/0009397 | A1 * | 7/2001 | Maloney | G08B 13/1454 340/572.8 |
| 2001/0027671 | A1 * | 10/2001 | Davis | E05B 17/2092 70/278.3 |
| 2002/0014950 | A1 * | 2/2002 | Ayala | G07C 9/00904 340/5.6 |
| 2002/0024420 | A1 | 2/2002 | Ayala et al. | |
| 2002/0095964 | A1 * | 7/2002 | Davis | E05B 47/063 70/278.3 |
| 2002/0134120 | A1 * | 9/2002 | Davis | G07C 9/00309 70/278.3 |
| 2002/0154511 | A1 * | 10/2002 | Verlage | B60Q 3/292 362/487 |
| 2002/0171536 | A1 * | 11/2002 | Barbulescu | B60R 25/2009 340/426.11 |
| 2002/0180582 | A1 | 12/2002 | Nielsen | |
| 2002/0196123 | A1 * | 12/2002 | Diehl | E05B 47/00 340/5.64 |
| 2003/0075462 | A1 * | 4/2003 | Hai | B65D 55/02 206/308.2 |
| 2003/0151494 | A1 * | 8/2003 | Kent | G07C 9/00896 340/5.32 |
| 2003/0160681 | A1 * | 8/2003 | Menard | G07C 9/00309 340/5.64 |
| 2003/0221466 | A1 * | 12/2003 | Hyatt, Jr. | E05B 47/063 70/278.2 |
| 2004/0003633 | A1 * | 1/2004 | Alexander | G07C 9/00563 70/277 |
| 2004/0027236 | A1 * | 2/2004 | Zhai | G07C 9/00857 340/5.6 |
| 2004/0032327 | A1 * | 2/2004 | Flick | G07C 9/00571 340/568.1 |
| 2004/0160305 | A1 * | 8/2004 | Remenih | G07C 9/21 340/5.22 |
| 2004/0243426 | A1 * | 12/2004 | Hashimoto | G07C 9/27 232/20 |
| 2005/0099305 | A1 * | 5/2005 | Maloney | G08B 13/1427 340/572.8 |
| 2005/0144994 | A1 * | 7/2005 | Lies | E05B 47/0676 70/278.2 |
| 2005/0161420 | A1 * | 7/2005 | Hardy | A47F 1/125 211/189 |
| 2005/0212656 | A1 * | 9/2005 | Denison | B60R 25/102 340/5.73 |

(56) References Cited

U.S. PATENT DOCUMENTS

2006/0137409 A1* 6/2006 Fawcett ............. G08B 13/2402 70/57.1
2006/0137411 A1* 6/2006 Fawcett .............. E05B 73/0052 70/57.1
2006/0169008 A1* 8/2006 Fawcett ................ E05B 67/003 70/57.1
2006/0170559 A1* 8/2006 Marsilio ............. E05B 73/0041 340/572.9
2006/0220391 A1* 10/2006 Baragano Gonzalez .................... E05B 47/0002 292/194
2006/0283219 A1 12/2006 Bendz et al.
2007/0039360 A1* 2/2007 Fawcett ................ E05B 45/005 70/57.1
2007/0082747 A1* 4/2007 Smith ..................... B60R 22/34 472/59
2007/0101775 A1* 5/2007 Fawcett .............. E05B 73/0052 70/57.1
2007/0107477 A1* 5/2007 Fawcett ................ E05B 67/003 70/57.1
2007/0131005 A1* 6/2007 Clare ................. G07C 9/00309 340/13.24
2007/0159328 A1* 7/2007 Belden ................. G08B 25/008 340/571
2007/0193971 A1* 8/2007 Hardy ................... A47F 5/0018 211/189
2007/0195490 A1* 8/2007 Howell ................... G07F 11/72 361/600
2007/0200673 A1* 8/2007 Godwin ............. G07C 9/00896 340/5.73
2007/0230201 A1* 10/2007 Oba ....................... H05B 45/20 362/501
2007/0236353 A1* 10/2007 Marsilio ................... G09F 3/14 340/572.1
2007/0240460 A1* 10/2007 Marsilio ............ G08B 13/2434 70/57.1
2007/0241910 A1* 10/2007 Marsilio ............... G09F 3/0329 340/572.9
2007/0247313 A1* 10/2007 Marsilio ............. E05B 73/0041 340/572.1
2007/0267489 A1* 11/2007 Borodulin ........... E05B 47/0002 235/382
2007/0271970 A1* 11/2007 Marsilio ............... G09F 3/0329 70/57.1
2007/0273536 A1* 11/2007 Marsilio ............ G08B 13/2434 340/572.9
2007/0296545 A1* 12/2007 Clare ................. G07C 9/00309 340/5.64
2008/0030332 A1* 2/2008 Marsilio ................... G09F 3/14 340/572.1
2008/0030333 A1* 2/2008 Marsilio ................... G09F 3/14 340/572.1
2008/0030334 A1* 2/2008 Marsilio ............ G08B 13/2434 340/572.1
2008/0034815 A1* 2/2008 Fawcett ................ E05B 45/005 70/57.1
2008/0054648 A1* 3/2008 Baragano Gonzalez .................... E05B 47/0607 292/71
2008/0066506 A1* 3/2008 Carbajal ............. E05B 47/0002 70/267
2008/0066507 A1* 3/2008 Trempala ........... G07C 9/00309 70/283.1
2008/0117053 A1* 5/2008 Maloney ............ G08B 13/2402 340/572.4
2008/0127686 A1* 6/2008 Hwang ............... E05B 47/0043 70/107
2008/0150684 A1* 6/2008 Gartner ............... E05B 47/0673 340/5.53
2008/0168811 A1* 7/2008 Nagelski ............... E05B 47/004 70/276
2008/0169250 A1* 7/2008 Nagelski ............... A47F 5/0861 211/7
2008/0174215 A1* 7/2008 Amstutz ................... E05G 1/00 312/117
2008/0196458 A1* 8/2008 Lu ....................... E05B 47/0012 70/257
2008/0209960 A1* 9/2008 Nagelski ............... A47F 5/0861 70/57.1
2008/0224865 A1* 9/2008 Leyden .................... G08B 5/36 340/568.1
2008/0236209 A1* 10/2008 Conti .................. E05B 73/0017 70/18
2008/0258869 A1* 10/2008 Ognjenovic ....... G07C 9/00896 340/5.73
2008/0283477 A1* 11/2008 Wamsley .................. A47F 1/04 211/4
2008/0302144 A1 12/2008 Martin
2009/0013736 A1* 1/2009 Voosen ..................... E05C 1/12 70/277
2009/0027161 A1* 1/2009 Kent .................. G07C 9/00896 340/5.73
2009/0040015 A1* 2/2009 Teng ...................... G08C 23/04 340/5.1
2009/0158786 A1* 6/2009 Fawcett .............. E05B 73/0029 70/57
2009/0249846 A1 10/2009 Gokcebay
2009/0255303 A1* 10/2009 Stobbe ............... G07C 9/00182 70/276
2010/0090830 A1* 4/2010 Conti .................. E05B 73/0029 340/571
2010/0123322 A1* 5/2010 Baragano Gonzalez .................... E05B 55/12 292/71
2010/0127862 A1* 5/2010 Sato ................... G07C 9/00896 340/540
2010/0139342 A1* 6/2010 Lie-Nielsen ........ E05B 47/0676 70/275
2010/0175438 A1* 7/2010 Sankey ............. G08B 13/2434 70/57.1
2010/0238031 A1* 9/2010 Belden, Jr. ......... G08B 13/1445 340/568.1
2010/0300163 A1* 12/2010 Loughlin ........... G07C 9/00896 70/301
2011/0025459 A1* 2/2011 Denison ................... G07C 9/27 340/5.51
2011/0050390 A1* 3/2011 Denison ................... G07C 9/33 340/5.51
2011/0050391 A1* 3/2011 Denison ................ G07F 7/1008 340/5.51
2011/0082882 A1* 4/2011 Denison ................... G07C 9/27 707/770
2011/0084799 A1* 4/2011 Ficko ....................... G07C 9/27 340/5.65
2011/0084840 A1 4/2011 Mercier et al.
2011/0087370 A1* 4/2011 Denison ................... G07C 9/21 700/236
2011/0094274 A1* 4/2011 Conti .................... E05B 45/005 70/57.1
2011/0113992 A1* 5/2011 Valiulis ................... A47F 3/002 109/51
2011/0154867 A1* 6/2011 Fawcett .............. E05B 73/0052 70/58
2011/0156866 A1* 6/2011 Denison ............. G07C 9/00182 340/5.54
2011/0187496 A1* 8/2011 Denison ............. G07C 9/00571 340/5.53
2011/0210818 A1* 9/2011 Denison ............. G07C 9/00571 340/5.6
2011/0220593 A1* 9/2011 Wamsley .............. A47F 5/0068 211/4
2011/0241879 A1* 10/2011 Fawcett ................ E05B 67/003 340/540
2011/0254661 A1* 10/2011 Fawcett ............. G08B 13/2482 340/5.61
2011/0283754 A1* 11/2011 Ezzo ................... E05B 73/0017 70/57.1

(56) References Cited

U.S. PATENT DOCUMENTS

2011/0291846 A1* 12/2011 Burdenko ........... E05B 47/0004 340/635
2012/0031153 A1* 2/2012 Conti .................. E05B 73/0017 70/14
2012/0042702 A1* 2/2012 Ezzo ................... E05B 73/0005 70/57.1
2012/0047972 A1* 3/2012 Grant ...................... E05B 45/00 70/77
2012/0055209 A1* 3/2012 Conti .................... E05B 45/005 70/15
2012/0056439 A1* 3/2012 Stendal ............... E05B 15/0205 292/340
2012/0119910 A1 5/2012 Belden, Jr. et al.
2012/0194322 A1 8/2012 Batra
2012/0222103 A1* 8/2012 Bliding .................... G07C 9/21 726/7
2012/0227447 A1* 9/2012 Conti .................. E05B 73/0029 70/15
2012/0298119 A1* 11/2012 Reese ................. F41H 13/0018 128/875
2013/0009770 A1* 1/2013 Yeager ............... G08B 13/2402 340/506
2013/0013133 A1* 1/2013 Walter ................. G08G 5/0021 701/11
2013/0014549 A1* 1/2013 Cavanaugh ............. E05B 37/00 70/63
2013/0081434 A1* 4/2013 Grant ...................... E05B 47/02 70/1.5
2013/0213100 A1* 8/2013 Cohen ................. E05B 47/0611 70/283.1
2014/0366594 A1 12/2014 Grant et al.
2015/0211258 A1* 7/2015 Gokcebay ................. E05C 1/04 70/278.1
2017/0254116 A1 9/2017 Grant et al.

FOREIGN PATENT DOCUMENTS

WO 2005-078667 A1 8/2005
WO 2009-014943 A1 1/2009
WO 2012-007775 A1 1/2012

OTHER PUBLICATIONS

Videx, Inc., "CyberLock A Complete Access Control System In Every Lock Core", 2010, pp. 1-16, Videx, Inc., Corvallis, Oregon.
Ivo Teutloff, Supplementary European Search Report for European Application No. 12837236.4, dated Apr. 10, 2015, 6 pages, European Patent Office, Munich, Germany.
First Examination Report from corresponding Australian Application No. 2012315844, dated Apr. 28, 2015 (3 pages).
First Office Action from corresponding Indian Patent Application No. 3125/CHENP/2014, dated Nov. 9, 2018 (8 pages).
Office Action from corresponding European Application No. 12837236.4, dated Jan. 16, 2019 (7 pages).
Summons to Attend Oral Proceedings from corresponding European Application No. 12837236.4, dated Oct. 11, 2019 (9 pages).

* cited by examiner

CABINET LOCK FOR USE WITH PROGRAMMABLE ELECTRONIC KEY

CROSS REFERENCE TO RELATED APPLICATIONS

This application is a continuation of U.S. application Ser. No. 15/600,090, filed May 19, 2017, which is a continuation of U.S. application Ser. No. 14/476,871, filed Sep. 4, 2014, which is a continuation of U.S. application Ser. No. 13/629,812, filed Sep. 28, 2012, now U.S. Pat. No. 8,860,574, which claims the benefit of U.S. Provisional Application No. 61/540,577, filed Sep. 29, 2011, and U.S. Provisional Application No. 61/625,054, filed Apr. 16, 2012, the entire disclosures of which are incorporated herein by reference.

FIELD OF THE INVENTION

The present invention relates generally to merchandise display security systems and methods for displaying and protecting items of merchandise from theft. More particularly, the invention relates to a merchandise security device and a merchandise security key. In exemplary embodiments, the invention is a cabinet lock for use with a programmable electronic key that communicates a security code with the cabinet lock and transfers electrical power to the cabinet lock. In an exemplary embodiment, the programmable electronic key and the cabinet lock communicate the security code via wireless communication, while the key transfers electrical power to the cabinet lock via inductive transfer.

BACKGROUND OF THE INVENTION

It is common practice for retailers to store and/or display relatively expensive items of merchandise that are subject to theft on or within a merchandise fixture, such as a security display (e.g. alarm stand), security fixture (e.g. display hook, cabinet, shelf, etc.) or security packaging. In most instances, the merchandise fixture openly displays the merchandise so that a potential purchaser may view, and in some instances, operate the merchandise before making a purchase. At the same time, the merchandise is secured by a merchandise security device so as to prevent, or at least deter, theft of the merchandise. The value of the merchandise, however, may nevertheless make the merchandise an attractive target for a shoplifter despite the presence of the merchandise security device. Thus, a determined shoplifter may still attempt to detach or remove the merchandise from the merchandise security device.

In the case of a security fixture, and in particular a merchandise display cabinet, the merchandise security device is oftentimes closed or locked with a lock to prevent merchandise from being removed from the cabinet without the assistance of an authorized person, such as a sales associate. In most instances, the lock includes a conventional tumbler or spring-biased lock mechanism operated by a non-programmable, manually operated mechanical or magnetic key. In certain instances, however, the merchandise security device is secured by a lock including a lock mechanism that is operated by a merchandise security key in the form of a programmable electronic key. An example of a merchandise security device including a lock mechanism operated by a programmable electronic key is the programmable electronic cabinet lock and associated programmable electronic key available from InVue Security Products Inc. of Charlotte, North Carolina, USA. The programmable electronic cabinet lock and key available from InVue Security Products is shown and described in co-owned U.S. application Ser. No. 13/222,225 filed on Aug. 31, 2011, entitled Electronic Key For Merchandise Security Device, the disclosure of which is incorporated herein by reference in its entirety.

The aforementioned cabinet lock presents a potential security concern for retailers in certain applications. More specifically, the cabinet lock must be completely separated from the conventional saw-tooth lock arm that is affixed to one of the cabinet doors in order to open the door and access the merchandise within the cabinet. As a result, the sales associate must hold the cabinet lock in one hand while removing the merchandise from the cabinet for the potential purchaser. The lock arm is typically disposed on the innermost door, and thus, is not available to replace the cabinet lock on the lock arm when the doors are overlapped to access the merchandise within the cabinet. If the sales associate temporarily places the cabinet lock behind or on a display counter, the lock may become lost or stolen while the sales associate's attention is focused on the potential sale. On the other hand, if the sales associate temporarily places the cabinet lock within a pocket of clothing, he or she may become distracted and neglect to replace the cabinet lock onto the cabinet.

Alternatively, the sales associate must close the cabinet doors and replace the cabinet lock on the lock arm immediately after retrieving the desired merchandise from within the cabinet. Replacing the cabinet lock each time merchandise is retrieved from the cabinet is both time consuming and distracting to the customer, especially when the customer desires to examine and evaluate multiple items of merchandise stored and secured within the same cabinet. In any event, separating the cabinet lock from the lock arm presents a potential security breach that must be addressed by the retailer. The merchandise security key for the cabinet lock likewise is typically separated from the cabinet lock after opening the cabinet. However, the key is oftentimes tethered to a conventional recoiler mechanism worn by the sales associate. Thus, when tethered to the sales associate, the merchandise security key for use with the cabinet lock does not present an additional security breach to be addressed by the retailer.

Accordingly, there exists a need for a merchandise security device for displaying and protecting items of merchandise from theft including a lock that can be unlocked using a merchandise security key to provide access to the merchandise without having to remove a portion of the lock from the security device. There exists a particular unresolved need for a merchandise security fixture, namely a merchandise display cabinet, including a cabinet lock that remains attached to the cabinet after being unlocked to access merchandise within the cabinet. There exists a more specific need for such a cabinet lock and a programmable electronic key that communicates data, for example a security code, with the cabinet lock and transfers electrical power from the key to the cabinet lock to unlock the cabinet.

BRIEF DESCRIPTION OF THE DRAWINGS

The detailed description of the invention provided below may be better understood with reference to the accompanying drawing figures, which depict one or more exemplary embodiments of a merchandise security device and a merchandise security key for use with the merchandise security device in a merchandise display security system and method according to the invention.

DETAILED DESCRIPTION OF EXEMPLARY EMBODIMENTS OF THE INVENTION

Figure 1:
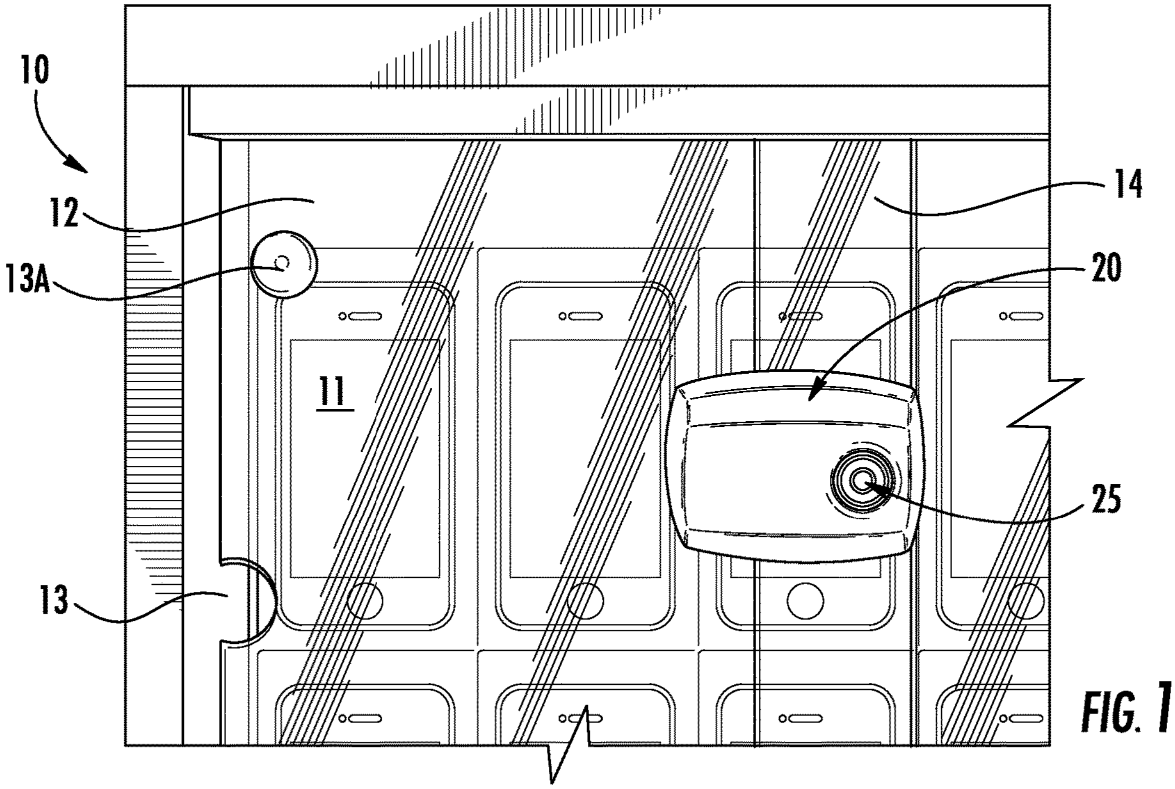
FIG. 1 illustrates a merchandise display security device for displaying and protecting items of merchandise from theft, namely a merchandise display cabinet including a cabinet lock according to the invention with the cabinet lock mounted on the cabinet in a locked configuration.

Referring now to the accompanying drawing figures wherein like reference numerals denote like elements throughout the various views, one or more exemplary embodiments of a merchandise display security device for protecting merchandise from theft are shown. A merchandise display security device according to the invention is operable for use with a merchandise fixture that stores and/or displays merchandise, for example, in a retail store. In the exemplary embodiments shown and described herein, a merchandise display cabinet, indicated generally at 10, is provided with a cabinet lock, indicated generally at 20, in accordance with the invention. A merchandise security key, indicated generally at 40, is provided to unlock the cabinet lock 20 and thereby access one or more items of merchandise 11 stored within the cabinet 10. The cabinet lock 20 does not contain an internal source of electrical power, and as such, is herein termed an "electrically passive" security device for purposes of describing the invention. The merchandise security key 40 contains an internal source of electrical power, such as a conventional extended-life or rechargeable battery, capacitor or the like, and transfers electrical power to the cabinet lock 20 for at least the purpose of unlocking the cabinet 10, as will be described in greater detail hereafter.

In particularly advantageous embodiments, the merchandise security key is a programmable electronic key 40 with inductive transfer capability and the cabinet lock 20 is provided with cooperating inductive receiving capability to both unlock and lock the cabinet 10. However, it should be noted that the invention is applicable to any merchandise display cabinet including a cabinet lock that remains attached to the cabinet while the cabinet lock is unlocked to access items of merchandise stored within the cabinet. Furthermore, merchandise display security devices suitable for use with the invention are not limited to a display cabinet and include, but are not limited to, a security display (e.g. alarm stand) as well as other security fixtures (e.g. display hook, shelf, rack, etc.), as well as security packaging for an item of merchandise. The broad concepts of the invention may also be applied to, for example, a door lock, a drawer lock or a shelf lock, as well as any two-piece locking device that prevents an unauthorized person from accessing, removing or detaching an item from a secure location or position. It is important to note that the cabinet lock 20 shown and described herein is self-contained and "universal" in the sense that it may be attached to any pair of overlapping doors without the need to provide a hole, opening, recess or the like in one or more of the doors in a conventional manner.

An exemplary embodiment of a merchandise display security device according to the invention is illustrated in FIGS. 1-4. The merchandise display security device depicted therein is operable for use with a merchandise fixture, namely a merchandise display cabinet 10 adapted for displaying and protecting items of merchandise 11 stored within the cabinet. The cabinet 10 includes a pair of overlapping doors that prevent access to the items of merchandise 11 when the doors are in a closed and locked configuration. As shown herein, the doors comprise an inner door 12 and an outer door 14 that are each substantially transparent so that the items of merchandise 11 can be viewed from outside the cabinet 10. However, the doors 12, 14 may be semi-translucent, translucent or opaque as desired to partially obscure or conceal the items of merchandise 11 from view. Regardless, the inner door 12 is positioned to the farthest left-hand side of the cabinet 10 and the overlapping outer door 14 is positioned to the farthest right-hand side of the cabinet in the closed and locked position depicted in FIG. 1. In this position, the cabinet lock 20 may be engaged in a locked configuration to prevent access to the items of merchandise 11 stored within the cabinet 10, while still permitting a potential purchaser to view the items. As will be readily understood by one skilled in the art, the "inner" and "outer" relative positions of the doors 12, 14 may be reversed, if desired.

Figure 2:
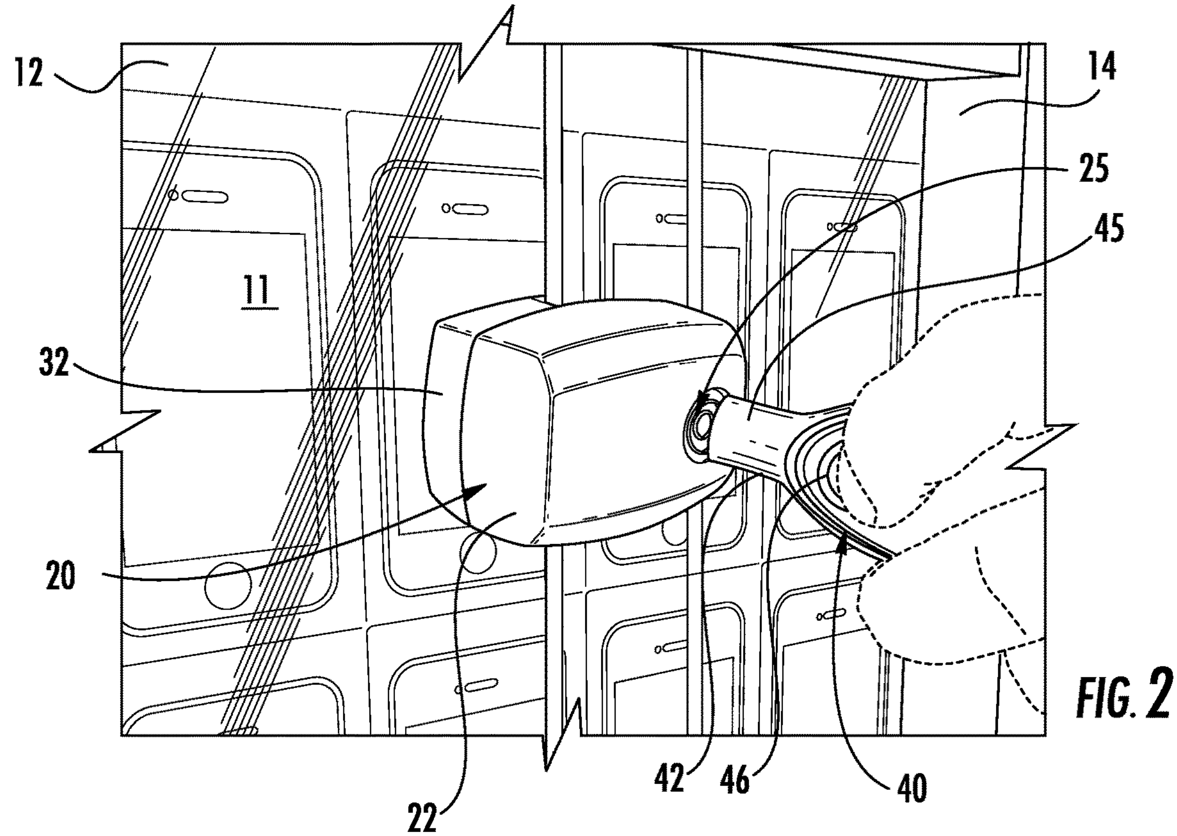
FIG. 2 illustrates an electronic merchandise security key according to the invention configured for use with the cabinet lock of FIG. 1 with the electronic key positioned to unlock the cabinet lock and thereby access merchandise stored within the cabinet.

As illustrated in FIG. 2, a programmable electronic key 40 is used with the doors 12, 14 in the closed and locked position depicted in FIG. 1 to at least unlock the cabinet lock 20 from the locked configuration. In other words, the cabinet lock 20 may be automatically placed into a locked configuration when the doors 12, 14 are moved to the closed positions shown in FIG. 1, for example by a biasing mechanism, such as an elastic spring. Alternatively, and as shown and described in the exemplary embodiments herein, the programmable electronic key 40 may be required to place the cabinet lock 20 into the locked configuration after the doors 12, 14 are moved to the closed positions shown in FIG. 1. It may be desirable that the programmable electronic key 40 is required to both unlock and lock (or re-lock) the cabinet lock 20 so that the authorized person responsible for unlocking the cabinet is held accountable for locking the cabinet 10 after each time his or her key is used to unlock the cabinet. For example, electronics disposed within the programmable electronic key 40 may be used to assign a unique identifier corresponding to the user of the key to a memory, and to thereafter record the date and time of each activation of the key into the memory. As will be described hereafter in greater detail with respect to exemplary embodiments of the invention, a successful activation of the key 40 occurs, for example, when a security code of the key matches a security code assigned to the cabinet lock 20, and the key subsequently transfers electrical power to the cabinet lock to operate a lock mechanism of the cabinet lock between a locked configuration and an unlocked configuration or between an unlocked configuration and a locked configuration.

Regardless, an elongate end of the programmable electronic key 40, referred to herein as transfer probe 45, is positioned over a location, such as a visual guide, indentation or recess, on an outward-facing exterior surface of the cabinet lock 20, referred to herein as transfer port 25. The key is then activated, for example as illustrated in FIG. 2, by depressing an actuator button 46 provided on the exterior of a housing 42 of the key. As will be explained further hereafter, activation of the actuator button 46 in the locked configuration causes a lock mechanism of the cabinet lock 20 to disengage (i.e. unlock), such that the doors 12, 14 of the cabinet 10 are permitted to be moved (i.e. slid) relative to one another to access the merchandise 11 stored within the cabinet. In particular, inner door 12 may be slid in the direction of the right-hand side of the cabinet 10 using a semi-circular recess 13 formed in the inner door, and/or outer door 14 may be slid in the direction of the left-hand side of the cabinet using a similar semi-circular recess (not shown) formed in the outer door.

Figure 3:
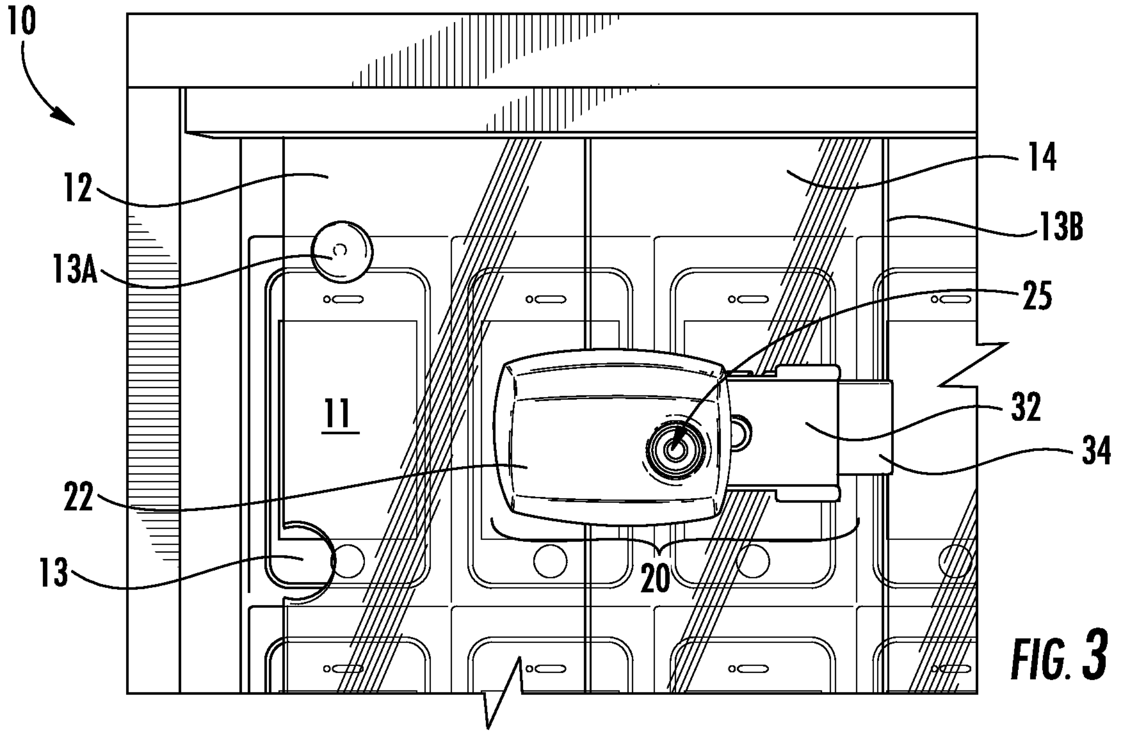
FIG. 3 illustrates the cabinet lock of FIG. 1 in an unlocked configuration with the left-hand door and the right-hand door of the cabinet partially opened.
Figure 4:
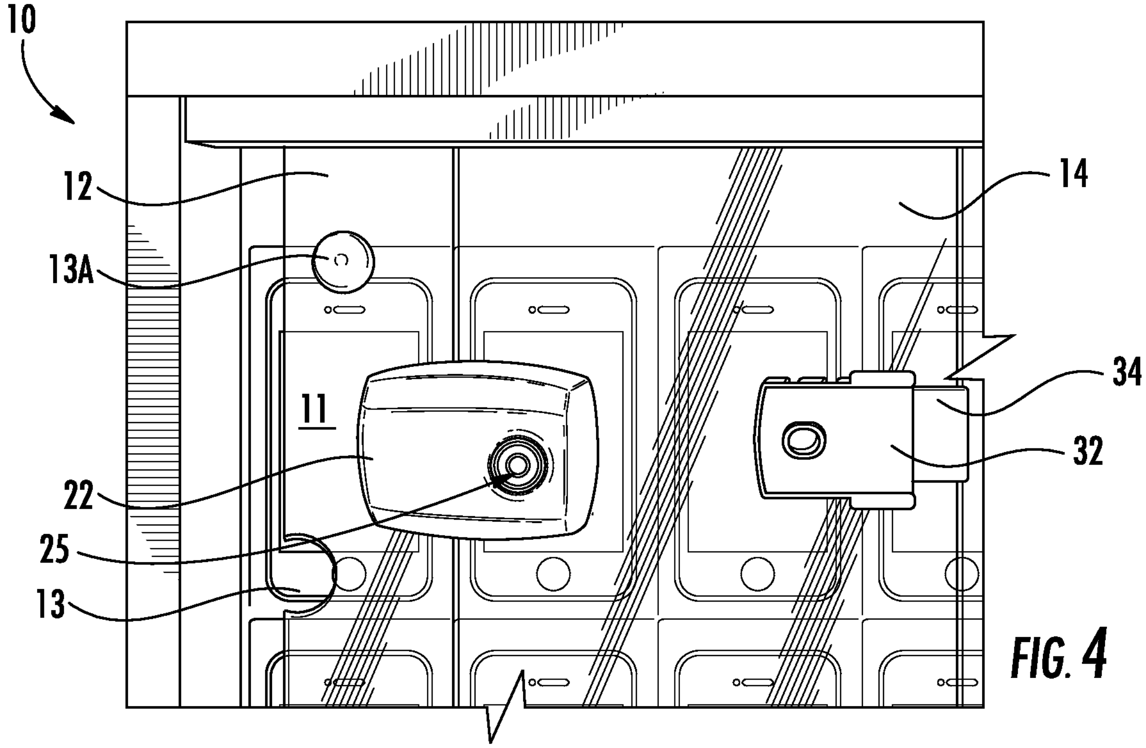
FIG. 4 illustrates the cabinet lock of FIG. 1 in an unlocked configuration with the left-hand door of the cabinet partially opened and the right-hand door of the cabinet further opened.

As depicted in FIG. 3, the inner door 12 has been moved in the direction of the outer door 14, while the outer door has been moved in the direction of the inner door. As depicted in FIG. 4, the outer door 14 has been moved further in the direction of the inner door 12 (i.e. towards the left) so that merchandise 11 disposed within the right-hand side of the cabinet 10 can be accessed and removed from the cabinet. Once the merchandise 11 has been accessed, for example by an authorized person, such as a sales associate, inner door 12 and outer door 14 may be returned to the farthest left-hand side and to the farthest right-hand side, respectively, of the cabinet to the closed position depicted in FIG. 1, for example using a grommet 13A provided on the inner door and/or a similar grommet (not shown) provided on the outer door. Thereafter, the cabinet lock 20 may be returned from the unlocked configuration to the locked configuration by repositioning the transfer probe 45 of the key 40 over the transfer port 25 on the cabinet lock 20 and depressing actuator button 46 again to cause the lock mechanism to engage (i.e. re-lock) with the doors 12, 14 of the cabinet 10 in the closed and locked position and thereby prevent access to the merchandise 11 stored within the cabinet.

Figure 5:
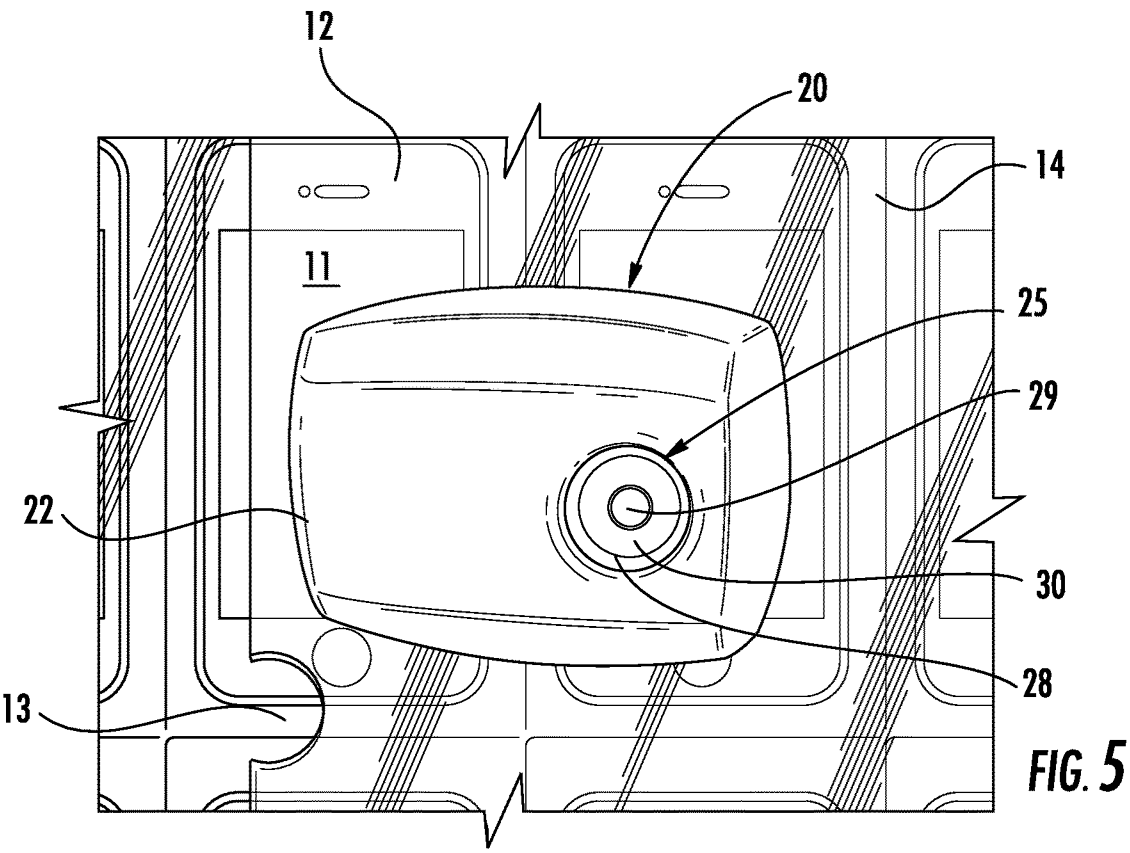
FIG. 5 shows an exemplary embodiment of a lock housing of the cabinet lock of FIG. 1.
Figure 6:
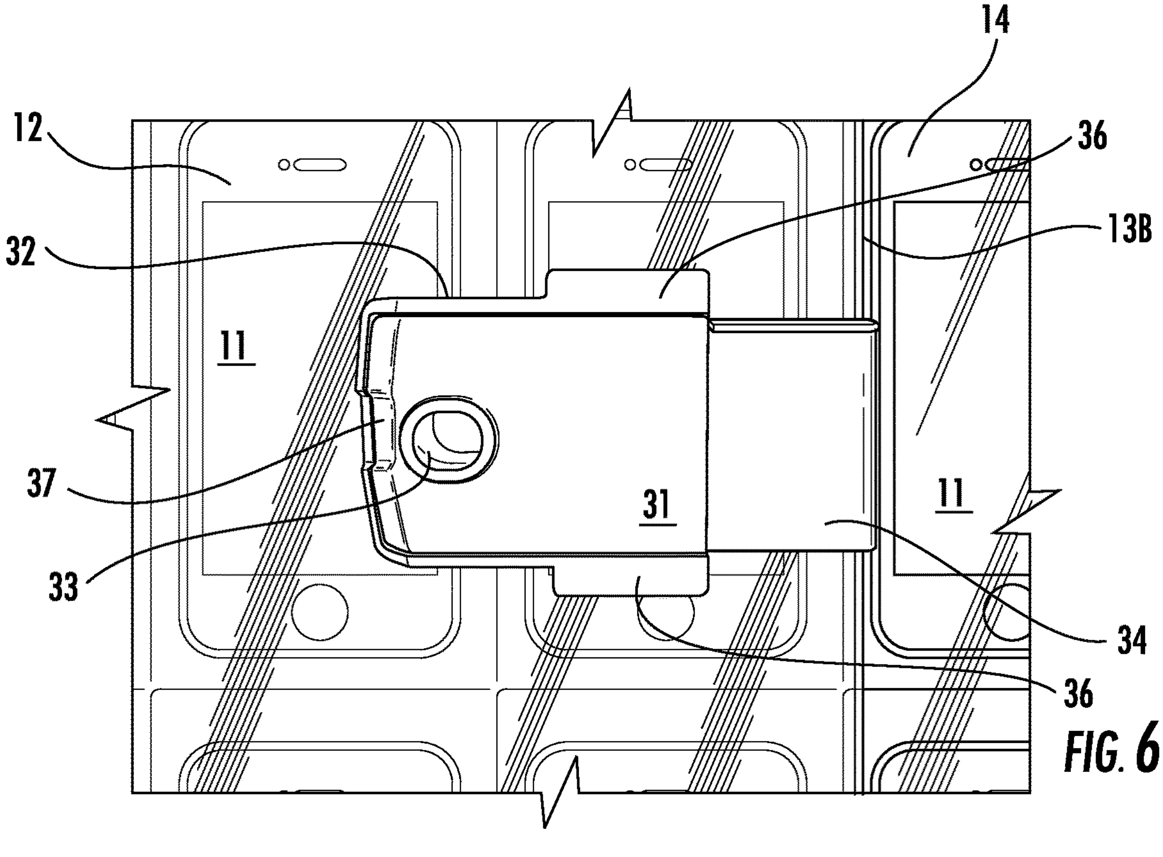
FIG. 6 shows an exemplary embodiment of a strike plate of the cabinet lock of FIG. 1.
Figure 7:
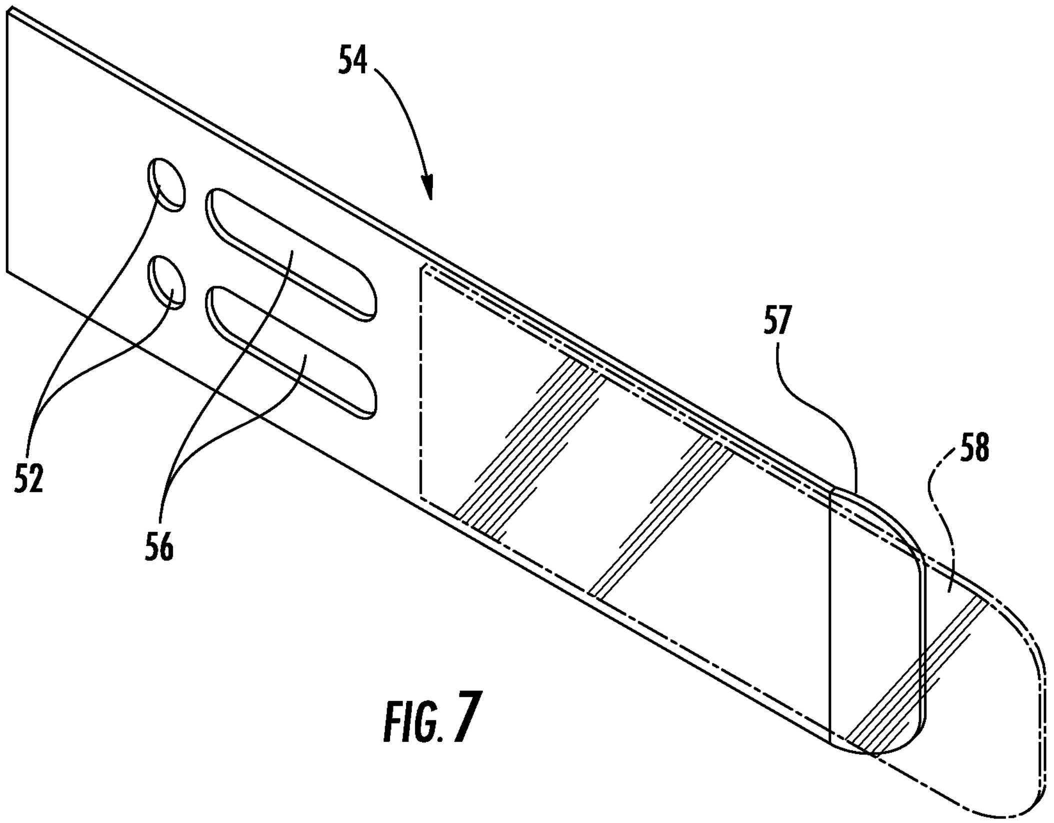
FIG. 7 shows an exemplary embodiment of an optional metal strap having through reliefs for use with the strike plate of FIG. 6.

As shown and described herein, the cabinet lock 20 comprises a lock housing 22 and a complimentary strike plate 32. An exemplary embodiment of a lock housing 22 suitable for use with the invention is shown in FIG. 5 and a corresponding exemplary embodiment of a strike plate 32 likewise suitable for use with the invention is shown in FIG. 6. The underside (i.e. backside) of the lock housing 22 is shown in FIG. 7. The lock housing 22 defines a generally hollow interior cavity or compartment that houses, among other things, electronics including a memory and a lock mechanism that is controlled by the electronics. The electronics may be disposed within the lock housing 22 in any known manner, for example, on a conventional printed circuit board PCB. It should be noted that the cabinet lock 20 is an "electrically passive" device, meaning that the lock housing 22 and the strike plate 32 do not comprise an internal source of electrical power for operating the lock mechanism. Furthermore, as shown and described herein, the lock housing 22 and/or the strike plate 32 do not comprise means for generating or storing potential energy sufficient to operate the lock mechanism. Accordingly, the cabinet lock 20 requires an external source of power to operate the lock mechanism, and more particularly, to move the lock mechanism between a locked configuration and an unlocked configuration.

The lock housing 22 may be affixed to the outer door 14 in any convenient manner. Preferably, lock housing 22 is affixed to the outer door 14 in a manner that does not require alteration to the outer door, and more specifically, does not require a hole, opening, recess or the like to be formed on, in or through the outer door. In the exemplary embodiment shown and described herein, the lock housing 22 is affixed to the exterior surface of the outer door 14 using a pressure sensitive adhesive (PSA), such as double-sided adhesive tape (not shown), in a conventional manner that is well known in the art. Similarly, strike plate 32 is affixed to the inner door 12 in a manner that does not require alteration to the inner door. In the exemplary embodiment shown and described herein, a strap 34 depends from the strike plate 32 towards the right-hand side of the cabinet 10 on the exterior surface of the inner door and wraps around an edge 13B of the inner door to the interior surface of the inner door. The strap 34 may be, for example, affixed to the exterior surface of the inner door 12 and to the opposite interior surface of the inner door using a pressure sensitive adhesive (PSA), such as double-sided adhesive tape (not shown), in a conventional manner that is well known in the art.

The strap 34 portion of the strike plate 32 may be made of a thin sheet of a relatively flexible material, such as fabric, soft plastic or composite (e.g. polyethylene, polypropylene, silicone, etc.) or rubber, so that the strap is readily formable around the edge 13B of the inner door 12 of the cabinet 10 from the exterior surface of the inner door to the interior surface of the inner door. However, it has been determined that the strap 34 may be vulnerable to an attempt by a potential thief to separate the strike plate 32 from the inner door 12 by cutting through the strap, and thereby gain access to the merchandise 11 stored within the cabinet 10. The strap 34 portion of the strike plate 32 may also be made of a thin sheet of a solid, yet relatively formable metal, such as soft aluminum, copper or the like. it has been further determined, however, that a strap 34 made of a pliable metal is subject to fatigue and may be vulnerable to an attempt by a potential thief to separate the strike plate 32 from the inner door 12 by first bending and then peeling the strap off the inner door, and thereby gain access to the merchandise 11 stored within the cabinet 10. As a result, it has been found advantageous to make a strap 34 portion of the strike plate 32 from a thin sheet of a relatively rigid, yet formable metal provided with one or more through reliefs. The through reliefs initially facilitate forming (i.e. bending) the strap 34 around the edge 13B of the inner door 12 of the cabinet 10. Thereafter, the reliefs frustrate and defeat tampering with the strap 34 by a potential thief attempting to separate the strike plate 32 from the inner door 12 of the cabinet 10 to thereby gain access to the merchandise 11 stored within the cabinet.

FIG. 7 shows an exemplary embodiment of a strap 54 portion of a strike plate 32 configured for use with the cabinet lock 20 of the present invention. The strap 54 is made of a relatively rigid, yet formable metal, such as soft steel, aluminum, copper or the like. In this exemplary embodiment, the strap 54 is made of 304 Stainless Steel dead soft, or an engineering equivalent material. The strap 54 has at least one, and preferably at least a pair of through holes 52 for securing the strap to the strike plate 32 with suitable fasteners (not shown). The strap 54 further has one or more through reliefs 56 for assisting in forming (i.e. bending) the end of the strap opposite the holes 52. As shown in FIG. 7, the strap 54 has a pair of through reliefs 56 in the form of elongated slots extending with the grain of the metal in the lengthwise direction of the strap. As previously mentioned, the slots 56 are configured and adapted to assist in forming the strap 54, and more particularly, for bending the end of the strap distal from the holes 52 around the edge 13B of the inner door 12 of the merchandise display cabinet 10 for use in a strike assembly of a cabinet lock 20 in the manner shown and described herein. If desired, the distal end of the strap 54 may be formed with an angled portion 57 relative to the remainder of the strap.

The strap 54 is also provided with a strap adhesive 58 for securing the strap to the interior surface of the inner door 12 of the merchandise display cabinet 10. In this exemplary embodiment, the strap adhesive 58 is a relatively thin layer of a pressure sensitive adhesive (PSA) commonly referred to in the art as double-sided tape. Strap adhesive 58 may be transparent, as indicated, or may be semi-transparent, translucent or opaque, as desired. A first side of the double-sided tape of the strap adhesive 58 is adhered to the distal end of the strap 54 on an interior side of the strap that is opposite the optional angled portion 55. The strap adhesive 20 is positioned adjacent the through reliefs 14 and extends away from the reliefs in the direction of the angled portion 55 and beyond the distal end of the strap. As best shown in FIG. 6, the strap 34, or optionally strap 54, is secured behind the strike plate 32 by the mechanical fasteners (not shown) that extend through the holes 52 provided in the strap. The strike plate 32, including the strap 54, is then adhered to an exterior surface of the inner door 12 of the merchandise display cabinet 10 using a like PSA, such as double-sided tape. The strap 54, including strap adhesive 58 adhered to the distal end of the strap is then formed (i.e. bent) around the edge 13B of the inner door 12 of the cabinet 10 and adhered to the interior surface of the inner door using the free side of the double-sided tape of the strap adhesive 58.

The through reliefs 56 disposed between the holes 52 used to secure the strap 54 to the strike plate 32 and the strap adhesive 58 serve to facilitate forming (i.e. bending) the strap 54 sufficiently, and more particularly, approximately one hundred eighty degrees (180°) around the edge 13B of the inner door 12 of the merchandise display cabinet 10. It should be noted that the reliefs 56 thereafter serve to defeat an attempt by a potential thief to tamper with the strap 54 and thereby separate the strike plate 32 from the inner door 12 of the cabinet 10 to thereby gain access to the merchandise 11 stored within the cabinet. Unlike a strap made of a relatively flexible material, or a strap made of a solid metal, the strap 54, being made of a relatively rigid, yet formable material due to through reliefs 56 tends to deform in the vicinity of the reliefs into geometry that defeats tampering efforts when a potential thief attempts to cut, rip, tear through, or otherwise separate the strap from the strike plate 32. More particularly, the strap 54 tends to collapse upon itself in the vicinity of the through reliefs 56, and thereby deform into an irregular shape that is resistant to further attempts to cut, rip, tear through, or otherwise separate the strap from the strike plate 32.

As previously mentioned, transfer port 25 of cabinet lock 20 is provided on the outward-facing exterior surface of lock housing 22 for receiving the transfer probe 45 of the programmable electronic key 40. In the exemplary embodiments shown and described herein, transfer probe 25 is a stepped recess formed in the exterior surface of lock housing 22 and comprises a thin film or screen 28 made of a durable plastic. Screen 28 has a circular center portion 29 surrounded by an annular portion 30. Center portion 29 is optically transparent for a purpose to be described. Annular portion 30 is preferably segmented, as will be described hereafter, to indicate various operational states of the cabinet lock 20, such as a locked configuration and an unlocked configuration. One or more segments of the annular portion 30 may be energized (e.g. illuminated) in a suitable manner to visually indicate a predetermined operational state of the cabinet lock 20. The center portion 29 of the transfer port 25 is optically transparent to permit electronics disposed within the programmable electronic key 40 to wirelessly communicate with the electronics (i.e. printed circuit board PCB) disposed within the lock housing 22 of the cabinet lock 20 in the manner shown and described in the aforementioned U.S. application Ser. No. 13/222,225. By way of example, the cabinet lock 20 and the programmable electronic key 40 may each be provided with an optical transceiver, for example an Infrared (IR) transceiver, for transmitting and receiving infrared (IR) signals therebetween. Alternatively, the transfer port 25 need not be optically transparent and the electronics disposed within the programmable key 40 may wirelessly communicate with the electronics (i.e. printed circuit board PCB) disposed within the lock housing 22 of the cabinet lock 20, for example via radio frequency (RF) transceivers transmitting and/or receiving RF signals therebetween.

In the exemplary embodiment shown and described herein, the programmable electronic key 40 may be programmed with a security code and the cabinet lock 20 may be programmed with the same security code, for example by the key or by the same security device that programmed the key. Thereafter, the transfer probe 45 of the key 40 is positioned within the transfer port 25 of the cabinet lock 20 and the actuator button 46 is pressed to activate communication of the security code between the cabinet lock and the key. In one example, the electronics of the key 40 verify that the cabinet lock 20 has a security code, and the electronics (i.e. printed circuit board PCB) disposed within the lock housing 22 of the cabinet lock then query the key for its security code. As previously described herein, the security code is wirelessly communicated between the cabinet lock 20 and the key 40 by Infrared (IR) optical transmission. Alternatively, the security code may be transmitted and received (i.e. transferred) by electrical contacts, acoustic transmission (e.g. RF signals) or magnetic induction. In the event that the security code of the key 40 matches the security code of the cabinet lock 20, the key is then permitted to transfer electrical power to the cabinet lock, for example, to operate the lock mechanism of the cabinet lock. The key 40 may transfer electrical power to the cabinet lock 20 in any suitable manner, such as by electrical contacts, acoustical transmission (e.g. RF signals) or magnetic induction. In exemplary embodiments, the programmable electronic key 40 transfers sufficient electrical power to the cabinet lock 20 to at least operate the lock mechanism by inductive transfer in the manner shown and described in the aforementioned U.S. application Ser. No. 13/222,225.

Figure 8:
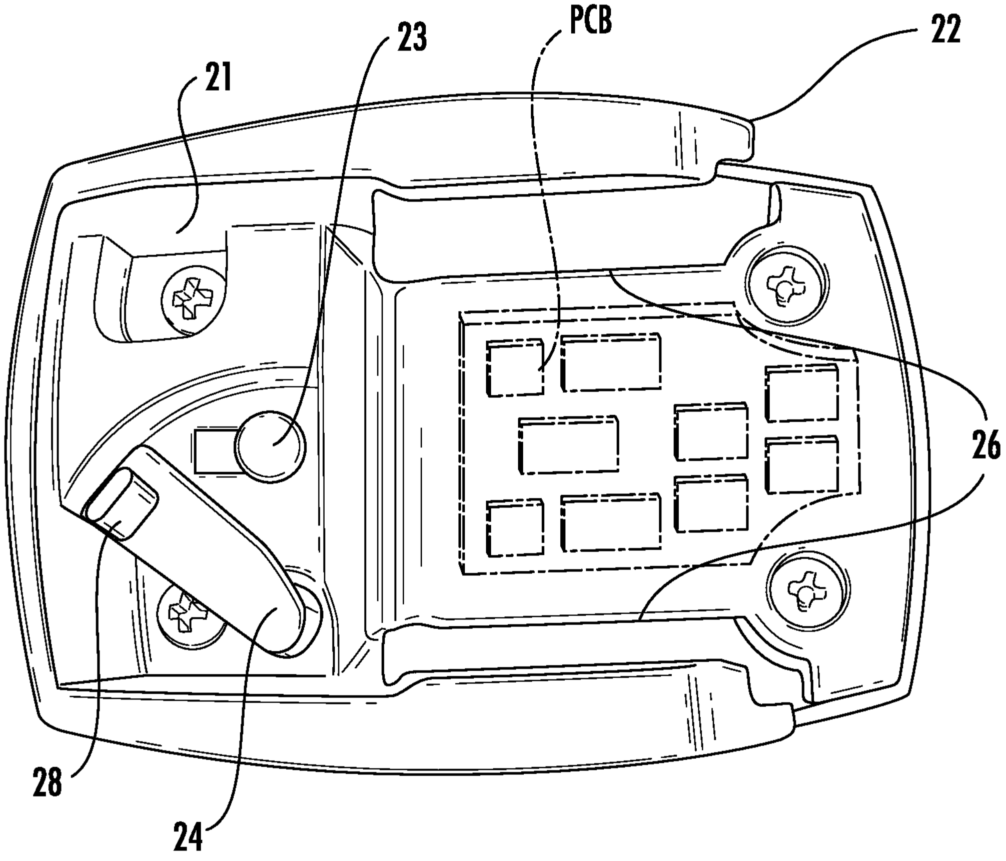
FIG. 8 shows the underside of the lock housing of FIG. 5.

As best shown in FIG. 8, lock housing 22 further comprises a plunger pin 23 that protrudes outwardly (i.e. towards the interior of the cabinet 10, and thus, in the direction of strike plate 32) from an underside 21 of the lock housing. A lock mechanism, such as conventional servo motor (not shown), disposed within the lock housing 22 is electrically operated by the electronics (i.e. printed circuit board PCB) disposed within the lock housing to move the plunger pin 23 between an extended (locked) position and a retracted (unlocked) position. In the retracted (unlocked) position, a movable blocking member 24 covers the plunger pin 23 to thereby prevent the plunger pin from being moved by the lock mechanism from the retracted (unlocked) position to the extended (locked) position. As best shown in FIG. 6, strike plate 32 has a hole, opening, recess or the like feature 33 formed in a topside 31 of the strike plate to receive the plunger pin 23 of the lock housing 22 in the extended (locked) position. Strike plate 32 further comprises opposed outwardly depending arms 36 that engage corresponding grooves 26 formed in the underside 21 of the lock housing 22. When cabinet lock 20 moves from the unlocked configuration (FIG. 4) to the locked configuration (FIG. 1), grooves 26 of the lock housing 22 are aligned in receiving relationship with arms 36 of the strike plate 32.

As lock housing 22 passes over the strike plate 32 going from the unlocked configuration to the locked configuration, a leading edge 37 (FIG. 6) of the strike plate 32 contacts a protrusion 28 to move the blocking member 24 on the underside 21 of the lock housing 22 away from plunger pin 23 so that the lock mechanism is thereafter permitted to move the plunger pin from the retracted (unlocked) position to the extended (locked) position. When arms 36 of the strike plate 32 are fully received within grooves 26 of the lock housing 22, feature 33 is aligned with plunger pin 23 so as to receive the plunger pin in the extended (locked) position. As previously mentioned, the cabinet lock 20 is required to receive electrical power transferred from the programmable electronic key 40 before the electronics (i.e. printed circuit board PCB) disposed within the lock housing 22 operate the lock mechanism to move the plunger pin 23 from the retracted (unlocked) position to the extended (locked) position. Accordingly, an authorized person, such as a sales associate, must position the transfer probe 45 of the programmable electronic key 40 within the transfer port 25 of the cabinet lock 20 and depress the actuator button 46 to verify the security code and activate the electronics (i.e. printed circuit board PCB) disposed within the lock housing 22 to operate the lock mechanism.

Figure 9:
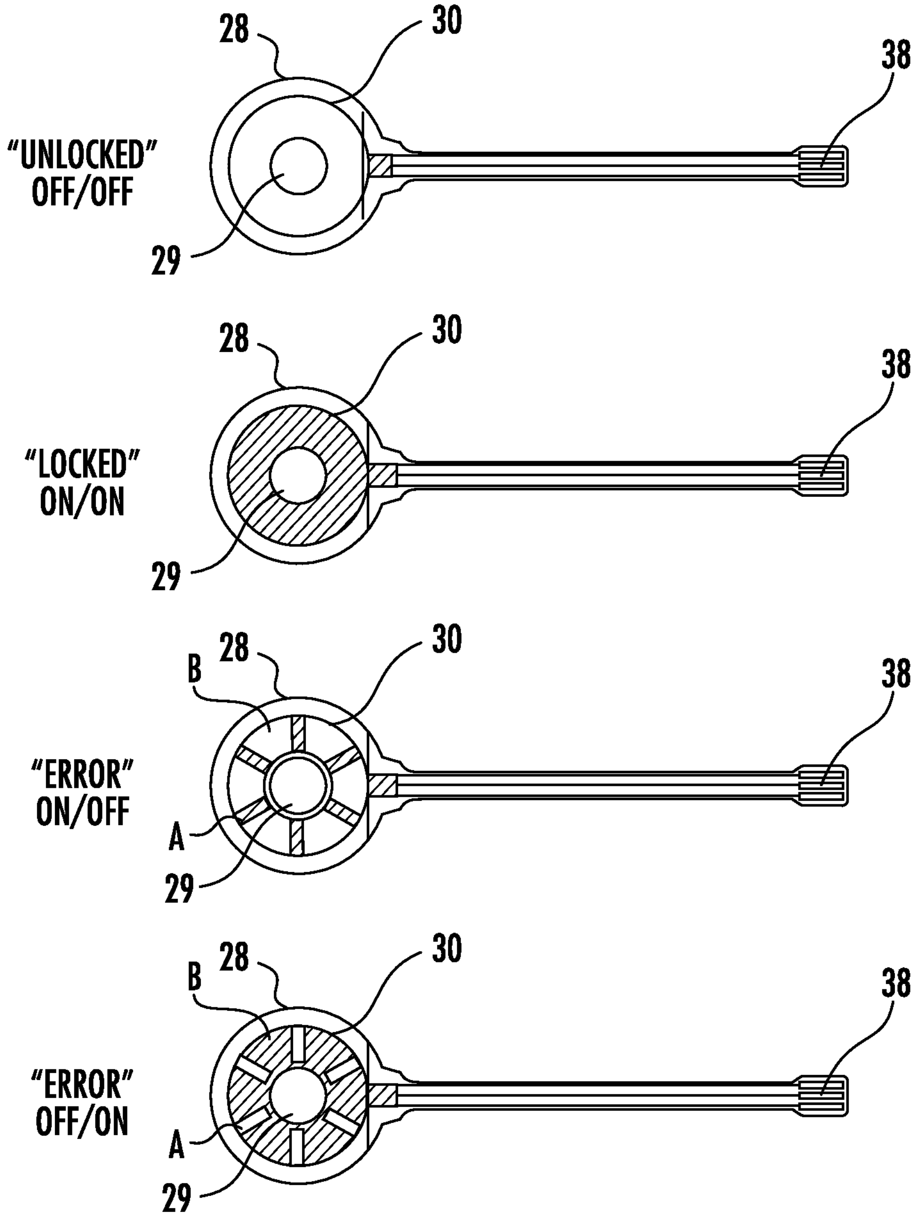
FIG. 9 illustrates various operational states of the cabinet lock as indicated by an indicator provided on the lock housing of FIG. 5.

As previously mentioned, cabinet lock 20 may be provided with an optional visual indicator to indicate the status of the lock mechanism, and thus, the status of the cabinet lock. In particular, the visual indicator may indicate whether the cabinet lock 20 is in a locked configuration (FIG. 1) or an unlocked configuration (FIG. 4). As previously mentioned, screen 28 of transfer port 25 comprises segmented annular portion 30. As illustrated in FIG. 9, annular portion 30 has at least two distinct segments that are energized for visually indicating the status of the cabinet lock 20. For example, annular portion 30 may comprise a plurality of smaller segments, indicated generally at A, that are separated by a plurality of larger segments, indicated generally at B. As shown, an "UNLOCKED" status may be visually indicated by the segments A and the segments B both not being energized by a suitable display technology (i.e. OFF). Conversely, a "LOCKED" status may be visually indicated by the segments A and the segments B both being energized by a suitable display technology (i.e. ON). A combination of the segments A being energized (i.e. ON) and the segments B not being energized (i.e. OFF); or conversely, the segments B being energized (i.e. ON) and the segments A not being energized (i.e. OFF), may visually indicate an "ERROR" state. An ERROR state may exist, for example, when blocking member 24 overlies plunger pin 23 such that the lock mechanism is unable to move the plunger pin from the retracted (unlocked) position to the extended (locked) position.

Regardless, segments A and segments B of the annular portion 30 of the screen 28 of transfer port 25 are electrically connected by conductive traces or wires to leads 38 provided on a distal end of the screen. In turn, leads 38 are electrically connected to the electronics (i.e. printed circuit board PCB) disposed within the lock housing 22 of the cabinet lock 20. A suitable display technology for energizing/illuminating segments A and segments B on the annular portion 30 of screen 28 is Electronic Paper Display (EPD), commonly known as "electronic paper," "e-paper," electronic ink" or "e-ink" of the type that is commercially available from E Ink Corporation of Cambridge, Massachusetts, USA. Furthermore, the programmable electronic key 40 may be provided with a visible and/or audible indicator for indicating that the cabinet lock 20 has been successfully moved from a locked configuration to an unlocked configuration, or conversely, from an unlocked configuration to a locked configuration. In addition or alternatively, the key 40 may be provided with a continuous or periodic visible and/or audible indicator that indicates the cabinet lock 20 is in an unlocked configuration. Furthermore, the programmable electronic key 40 may provide a distinctly different visible and/or audible indication if the cabinet lock is in an ERROR state, or alternatively, if the key fails for any reason to successfully transfer electrical power from the key to the cabinet lock 20 to operate the lock mechanism of the cabinet lock.

The exemplary embodiments provided herein also broadly describe a merchandise display security system and method including a programmable electronic key that transfers electrical power to a merchandise security device for use with a merchandise fixture wherein the merchandise security device comprises a lock mechanism that is operated by the electrical power transferred from the key to the security device. The system and method may further comprise an optional programming station operable for programming the electronic key with a security code, for example a Security Disarm Code (SDC). The electronic key and the security device may each be pre-programmed with the same SDC into a respective permanent memory. Alternatively, the electronic key may first be programmed with the SDC by the programming station and the security device may subsequently be programmed with the same SDC by the programming station or by the electronic key. The electronic key may be provisioned with a single-use (i.e. non-rechargeable) internal power source, such as a conventional or extended-life battery. Alternatively, the electronic key may be provisioned with a multiple-use (i.e. rechargeable) internal power source, such as a conventional capacitor or rechargeable battery.

In either instance, the internal source of electrical power may be permanent, semi-permanent (i.e. replaceable), or rechargeable, as desired. In the latter instance, the system and method may further comprise an optional charging station with, for example, inductive power transfer capability operable to initially charge and/or to subsequently recharge the internal power source of the electronic key. Furthermore, the electronic key and/or the security device may be provided with only a transient memory, such that the SDC must be reprogrammed periodically. In this instance, the programming station is configured to initially program and to subsequently reprogram the SDC into the electronic key and the security device, or alternatively, the electronic key is operable to initially program and to subsequently reprogram the security device with the SDC. The electronic key is further operable to transfer electrical power to the security device to operate the lock mechanism. In other exemplary embodiments, the electronic key is operable to wirelessly communicate the security code with the security device and to transfer electrical power by induction to operate the lock mechanism of the security device.

It will be readily apparent to those skilled in the art that the cabinet lock shown and described herein is but one of a number of "electrically passive" merchandise security devices including a lock mechanism that can be configured to be operated by an electronic key in accordance with the invention. By way of example and without limitation, the merchandise security device may be a locking base for securing a merchandise display hook to a display support, such as pegboard, slatwall, bar stock or wire grid, or may be a locking end assembly for preventing the rapid removal of merchandise from the merchandise display hook. Alternatively, the merchandise security device may be a merchandise security display stand comprising a physical lock mechanism for securing the display stand to a display support, such as a table, counter, desk, wall, or other fixed structure. Alternatively, the merchandise security device may be incorporated into packaging for one or more items of merchandise comprising a lock mechanism for separating the packaging from the merchandise or for removing the merchandise from the packaging. Still further, the merchandise security device may be a conventional door or window lock for preventing access to a room, booth, or enclosure. In any embodiment, the merchandise security device may further comprise an electronic sensor, such as a conventional proximity, limit or contact switch, and an associated electronic monitoring circuit that activates an alarm in response to the switch being actuated or the integrity of the switch or the monitoring circuit being compromised.

That which is claimed is:

1. A security device for protecting items from theft, the security device comprising:

a lock comprising a lock housing adapted to be affixed to a first piece of a fixture, the lock housing comprising a lock mechanism, the lock mechanism comprising a motor configured to move an actuator relative to the lock housing; and a strike plate configured to be affixed to a second piece of the fixture, the lock mechanism configured to lock the first piece of the fixture relative to the second piece of the fixture in a locked configuration, wherein the lock housing comprises an opening and the strike plate comprises opposed outwardly extending surfaces that are configured to be at least partially received by the opening in the locked configuration when the lock housing is moved relative to the strike plate, wherein the lock mechanism is configured to receive electrical power from an electronic key for moving the actuator into engagement with the strike plate in the locked configuration, wherein the lock mechanism is configured to receive electrical power from the electronic key for moving the actuator out of engagement with the strike plate in an unlocked configuration.

2. The security device of claim 1, wherein the lock mechanism is electrically passive.

3. The security device of claim 1, further comprising an indicator for indicating a state of the lock mechanism.

4. The security device of claim 1, wherein the strike plate has an opening formed therein, and wherein the actuator is configured to move into engagement with the opening in the locked configuration and to move out of engagement with the opening in the unlocked configuration.

5. The security device of claim 1, wherein the lock housing and the strike plate are each configured to be affixed to a cabinet, a door, a drawer, a shelf, or a two-piece locking device.

6. The security device of claim 1, wherein the lock housing and the strike plate are each configured to be affixed to the fixture without the need to provide a hole, an opening, or a recess in or through the fixture.

7. The security device of claim 1, wherein the strike plate is configured to be affixed to the first piece of a two-piece locking device, and wherein the lock housing is configured to be affixed to the second piece of the two-piece locking device and to be operably coupled with the strike plate in the locked configuration, each of the first piece and the second piece configured to slide relative to one another.

8. The security device of claim 1, wherein the lock housing does not comprise an internal source of electrical power or means for generating or storing potential energy for operating the lock mechanism.

9. The security device of claim 1, wherein each of the lock housing and the strike plate are affixed to the fixture with a pressure-sensitive adhesive.

10. The security device of claim 1, further comprising the electronic key configured to transfer electrical power to the lock to operate the lock mechanism in response to activation of the electronic key.

11. The security device of claim 10, wherein the electronic key is configured to transfer electrical power to the lock by inductive transfer in response to actuating a button on the electronic key.

12. The security device of claim 10, wherein the electronic key is programmed with a security code and is configured to communicate the security code with the lock by wireless communication, and wherein the lock mechanism is only operated if the security code of the electronic key matches the security code of the lock.

13. The security device of claim 12, wherein the electronic key is configured to communicate the security code with the lock by infrared (IR) optical transmission.

14. The security device of claim 1, wherein each of the lock housing and the strike plate comprises at least one engagement member configured to engage with one another in the locked configuration in response to movement of the first piece of the fixture relative to the second piece of the fixture.

15. The security device of claim 14, wherein the at least one engagement member of the lock housing is configured to engage the at least one engagement member of the strike plate in response to sliding the lock housing and the strike plate relative to one another.

16. The security device of claim 14, wherein the at least one engagement member of the lock housing is fixed relative to the lock housing, and wherein the at least one engagement member of the strike plate is fixed relative to the strike plate.

17. The security device of claim 1, wherein no physical force is required to be exerted by the electronic key on the lock mechanism in order to unlock the lock mechanism.

18. The security device of claim 1, further comprising the electronic key having a memory, wherein the memory is configured to record an identifier for a user of the electronic key and a date and time of each activation of the electronic key.

19. The security device of claim 1, wherein the lock mechanism is configured to receive electrical power from the electronic key in response to activation of the electronic key for moving the actuator out of engagement with the strike plate, and wherein the lock mechanism is configured to receive electrical power from the electronic key in response to subsequently activating the electronic key for moving the actuator into engagement with the strike plate in the locked configuration.

20. The security device of claim 1, wherein the actuator is a plunger, and wherein the motor is configured to extend and retract a plunger relative to the lock housing.

21. The security device of claim 1, wherein the opening is defined by a pair of grooves, each of the grooves configured to at least partially receive a respective outwardly extending surface of the strike plate.

22. The security device of claim 1, wherein the opening is defined on an underside of the lock housing.

23. A method for protecting items from theft, the method comprising:

affixing a lock housing to first piece of a fixture, the lock mechanism comprising an actuator configured to move relative to the lock housing, the lock housing comprises opening;

affixing a strike plate to a second piece of the fixture, the strike plate comprises opposed outwardly extending surfaces, the lock mechanism configured to lock the first piece of the fixture relative to the second piece of the fixture in a locked configuration;

moving the lock housing relative to the strike plate to the locked configuration to cause the opposed outwardly extending surfaces to be at least partially received by the opening;

activating an electronic key to transfer electrical power to the lock mechanism for moving the actuator out of engagement with the strike plate to an unlocked configuration; and subsequently activating the electronic key to transfer electrical power to the lock mechanism for moving the actuator into engagement with the strike plate to the locked configuration.

24. The method of claim 23, wherein affixing each of the lock housing and the strike plate to the fixture comprises affixing without the need to provide a hole, an opening, or a recess in or through the fixture.

25. The method of claim 23, wherein activating comprises activating the electronic key to transfer electrical power to the lock mechanism for moving the actuator out of engagement with the strike plate to the unlocked configuration without the electronic key exerting any physical force on the lock mechanism, and wherein subsequently activating comprises subsequently activating the electronic key to transfer electrical power to the lock mechanism for moving the actuator into engagement with the strike plate to the locked configuration without the electronic key exerting any physical force on the lock mechanism.

26. The method of claim 23, wherein affixing each of the lock housing and the strike plate to the fixture comprises affixing to a cabinet, a door, a drawer, a shelf, or a two-piece locking device.

27. The method of claim 23, further comprising moving the first piece of the fixture relative to the second piece of the fixture to cause the actuator to engage the strike plate in the locked configuration.

* * * * *